(12) United States Patent
Ambridge et al.

(10) Patent No.: US 11,598,479 B2
(45) Date of Patent: Mar. 7, 2023

(54) DISPLAY SUPPORT STRUCTURE

(71) Applicant: COLEBROOK BOSSON & SAUNDERS (PRODUCTS) LIMITED, Melksham (GB)

(72) Inventors: Alex Ambridge, London (GB); Simon Bibby, London (GB); Kevin Oliver, London (GB)

(73) Assignee: COLEBROOK BOSSON & SAUNDERS (PRODUCTS) LIMITED, Melksham (GB)

( * ) Notice: Subject to any disclaimer, the term of this patent is extended or adjusted under 35 U.S.C. 154(b) by 0 days.

(21) Appl. No.: 16/645,164

(22) PCT Filed: Dec. 10, 2018

(86) PCT No.: PCT/EP2018/084236
§ 371 (c)(1),
(2) Date: Mar. 6, 2020

(87) PCT Pub. No.: WO2020/119886
PCT Pub. Date: Jun. 18, 2020

(65) Prior Publication Data
US 2021/0293375 A1 Sep. 23, 2021

(51) Int. Cl.
*F16M 11/20* (2006.01)
*F16M 11/24* (2006.01)

(52) U.S. Cl.
CPC ......... *F16M 11/2064* (2013.01); *F16M 11/24* (2013.01); *F16M 2200/027* (2013.01); *F16M 2200/068* (2013.01)

(58) Field of Classification Search
CPC .............. F16M 11/2064; F16M 11/24; F16M 2200/027; F16M 2200/068; F16M 11/043;
(Continued)

(56) References Cited
U.S. PATENT DOCUMENTS

D275,431 S 9/1984 Usab
D323,323 S 1/1992 Klaebel
(Continued)

FOREIGN PATENT DOCUMENTS

CN 105605379 A 5/2016
CN 206112442 U 4/2017
(Continued)

OTHER PUBLICATIONS

U.S. Office Action for related U.S. Appl. No. 29/672,901 dated Mar. 31, 2021 (13 Pages).
(Continued)

*Primary Examiner* — Christopher Garft
(74) *Attorney, Agent, or Firm* — Michael Best & Friedrich LLP (57) ABSTRACT

A support structure for supporting a display includes a post extending between a first end and a second end, an arm movably coupled to the post, and a grip assembly for moveably coupling the arm to the post. The grip assembly includes a housing, an actuator assembly, a retention component movably positioned in the housing, and a resilient member that biases the retention component to a first position, in which, the grip assembly is engaged to the post.

23 Claims, 8 Drawing Sheets

(58) Field of Classification Search
CPC ......... F16M 11/28; F16B 7/14; F16B 7/1418; F16B 7/1427; F16B 7/1454; F16B 7/1463
USPC .......... 248/276, 125.1, 222.13, 230.2, 316.2, 248/295.11, 121, 122.1, 124.1–125.3
See application file for complete search history.

(56) References Cited

U.S. PATENT DOCUMENTS

| | | | |
|---|---|---|---|
| D337,173 S | 7/1993 | Yamada et al. | |
| D337,736 S | 7/1993 | Tolman et al. | |
| D380,144 S | 6/1997 | Lew | |
| D391,148 S | 2/1998 | Rosen | |
| 6,209,829 B1* | 4/2001 | Yu | G10G 5/00 248/185.1 |
| 6,473,916 B2* | 11/2002 | Schiødt | E03C 1/06 4/615 |
| D491,574 S | 6/2004 | Hung | |
| D507,477 S | 7/2005 | Pfister | |
| D577,731 S | 9/2008 | Altonji et al. | |
| D594,010 S | 6/2009 | Altonji et al. | |
| D655,297 S | 3/2012 | Magnusson | |
| D655,532 S | 3/2012 | Saelid | |
| D660,845 S | 5/2012 | Schmauch et al. | |
| 8,448,270 B2* | 5/2013 | Yang | E03C 1/066 248/222.12 |
| D742,206 S | 11/2015 | Bowman et al. | |
| 9,700,711 B2 | 7/2017 | Grant et al. | |
| D845,963 S | 4/2019 | Lindo et al. | |
| D875,105 S | 2/2020 | Xiang et al. | |
| D879,792 S | 3/2020 | Glickstein et al. | |
| D879,793 S | 3/2020 | Glickstein et al. | |
| D880,377 S | 4/2020 | Spencer et al. | |
| D883,298 S | 5/2020 | Wakasugi et al. | |
| 10,704,240 B2* | 7/2020 | Lin | E03C 1/066 |
| 10,767,809 B2 | 9/2020 | Lau et al. | |
| D918,218 S | 5/2021 | Lyu | |
| D919,631 S | 5/2021 | Shu | |
| D921,645 S | 6/2021 | Shu | |
| 2006/0157627 A1* | 7/2006 | Hung | F16M 11/10 248/231.71 |
| 2007/0102607 A1* | 5/2007 | Koh | F16M 11/2064 248/276.1 |
| 2007/0245483 A1* | 10/2007 | Eilmus | E03C 1/06 4/567 |
| 2010/0263968 A1* | 10/2010 | Petner | F16B 7/1463 188/67 |
| 2014/0367137 A1* | 12/2014 | Leung | H02G 1/00 174/68.3 |
| 2014/0374557 A1* | 12/2014 | Yu | F16B 7/1454 248/230.2 |
| 2015/0342351 A1* | 12/2015 | Hung | G09F 15/0087 211/26 |
| 2016/0352054 A1 | 12/2016 | Xiang et al. | |
| 2018/0112820 A1 | 4/2018 | Lau | |

FOREIGN PATENT DOCUMENTS

| | | |
|---|---|---|
| DE | 4318669 A1 | 12/1994 |
| EP | 1312852 A2 | 5/2003 |
| GB | 2555421 A | 5/2018 |
| JP | 03193302 U | 9/2014 |
| JP | 2017150498 A | 8/2017 |

OTHER PUBLICATIONS

International Search Report with Written Opinion for related Application No. PCT/EP2018/084236 dated Aug. 21, 2019 (12 Pages).
Office Action issued from the Chinese Patent Office for related Application No. 201880038555.1 dated Sep. 5, 2022 (19 Pages including English Translation).
Indian Patent Office Action for Application No. 201947050109 dated Nov. 14, 2022 (6 pages including English translation).

* cited by examiner

DISPLAY SUPPORT STRUCTURE

BACKGROUND

The present invention relates to a support structure and more particularly to a support structure for a screen.

Displays, such as computer monitors, TVs, etc., are often used in working environments. Typically, displays are supported by support structures. It is often desired by users to be able to adjust the height of the displays in order to gain a better view of the display. However, many support structures for displays are difficult to adjust and require great effort by the user to adjust the height. In addition, many displays are supplied with incorporated support structures that are either difficult to adjust or do not allow a range of movement required for a full ergonomic solution.

SUMMARY

In one embodiment, the invention provides a support structure for supporting a display including a post extending between a first end and a second end, an arm movably coupled to the post, and a grip assembly for moveably coupling the arm to the post. The grip assembly includes a housing, an actuator assembly, a retention component movably positioned in the housing, and a resilient member that biases the retention component to a first position, in which, the grip assembly is engaged to the post.

In another embodiment, the invention provides a support structure including a post extending between a first end and a second end. The post includes a track. The support structure also includes an arm movably coupled to the post and a grip assembly for moveably coupling the arm to the post. The grip assembly includes a housing with a forward extending lip positioned on the track of the post, an actuator assembly, a retention component movably positioned in the housing, and a resilient member that biases the retention component to a first position, in which, the grip assembly is engaged to the post.

In another embodiment, the invention provides a grip assembly for coupling a support structure to a post including an inner housing with a first portion and a second portion. The first and second portions define a cavity therebetween. The grip assembly also includes a retention member movably positioned within the cavity of the inner housing. The retention member includes a wedge component, a contact surface, and a channel that is defined between the wedge component and the contact surface. The grip assembly further includes a first button positioned in the channel of the retention member, a second button positioned opposite the first button in the channel of the retention member, and a resilient member that biases the retention member to a first position in which the contact surface engages the post. Movement of the first and second buttons towards each other moves the retention member against the bias of the resilient member to a second position in which the contact surface is disengaged from the post.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

Figure 1:
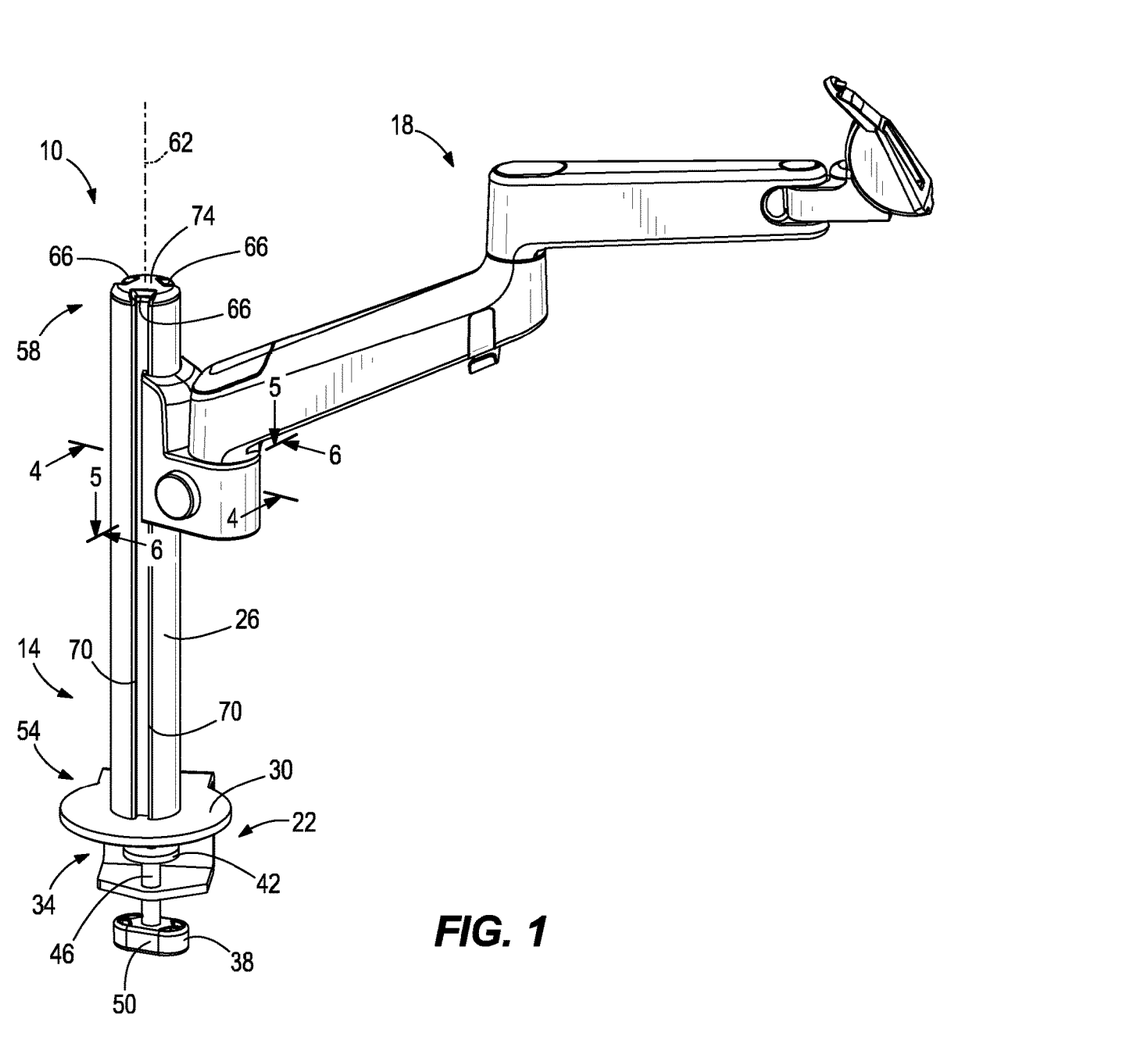
FIG. 1 is a perspective view of a support structure.

With reference to FIG. 1, a support structure 10 is configured to support a computer monitor, screen, or other display. The support structure 10 may be coupled to a base. Examples of bases are horizontal bases such as desktops and table tops, vertical bases such as walls and posts, or other bases such as a slanting ceiling having an angle between horizontal and vertical. In some embodiments, the support structure 10 is able to be articulated to a number of positions so that a display can be positioned in a preferred way for a user. As such, the support structure 10 is movable into a variety of positions. The support structure 10 includes a post assembly 14 and an arm assembly 18 that is movably coupled to the post assembly 14. The post assembly 14 includes a clamp 22 that may be secured to an edge of a table or desk and a post 26 extending vertically from the clamp 22. The clamp 22 includes a c-shaped bracket 30 that defines a channel 34 for receiving a table or desk. The clamp 22 further includes a fastener 38 extending into the channel 34 that secures the support structure 10 in place. The fastener 38 includes a flange 42 with a flat surface that engages a support, a shaft 46, and a knob 50. When the support structure 10 is positioned for use, a user can use the knob 50 to tighten the clamp 22 and secure the support structure 10 in place. In other embodiments, the support structure 10 may include other means of coupling to a support.

With continued reference to FIG. 1, the post 26 includes a first end 54 adjacent the clamp 22, a second end 58 opposite the first end 54, and an axis 62 that extends centrally through the post 26 between the first and second ends 54, 58. The post 26 has a length defined along the axis 62 that is between approximately one foot and approximately four feet. In other embodiments, the post may be longer than four feet or less than a foot. The post 26 further includes a plurality of tracks 66 that extend from the first end 54 to the second end 58. In the illustrated embodiment, there are three tracks 66. In other embodiments, there may be more or less than three tracks 66. The tracks 66 include edges 70 that engage the arm assembly 18 for translation along the axis 62 between the first and second ends 54, 58 of the post 26. In the illustrated embodiment, the post 26 includes an end cap 74 that further defines part of the tracks 66.

Figure 2:
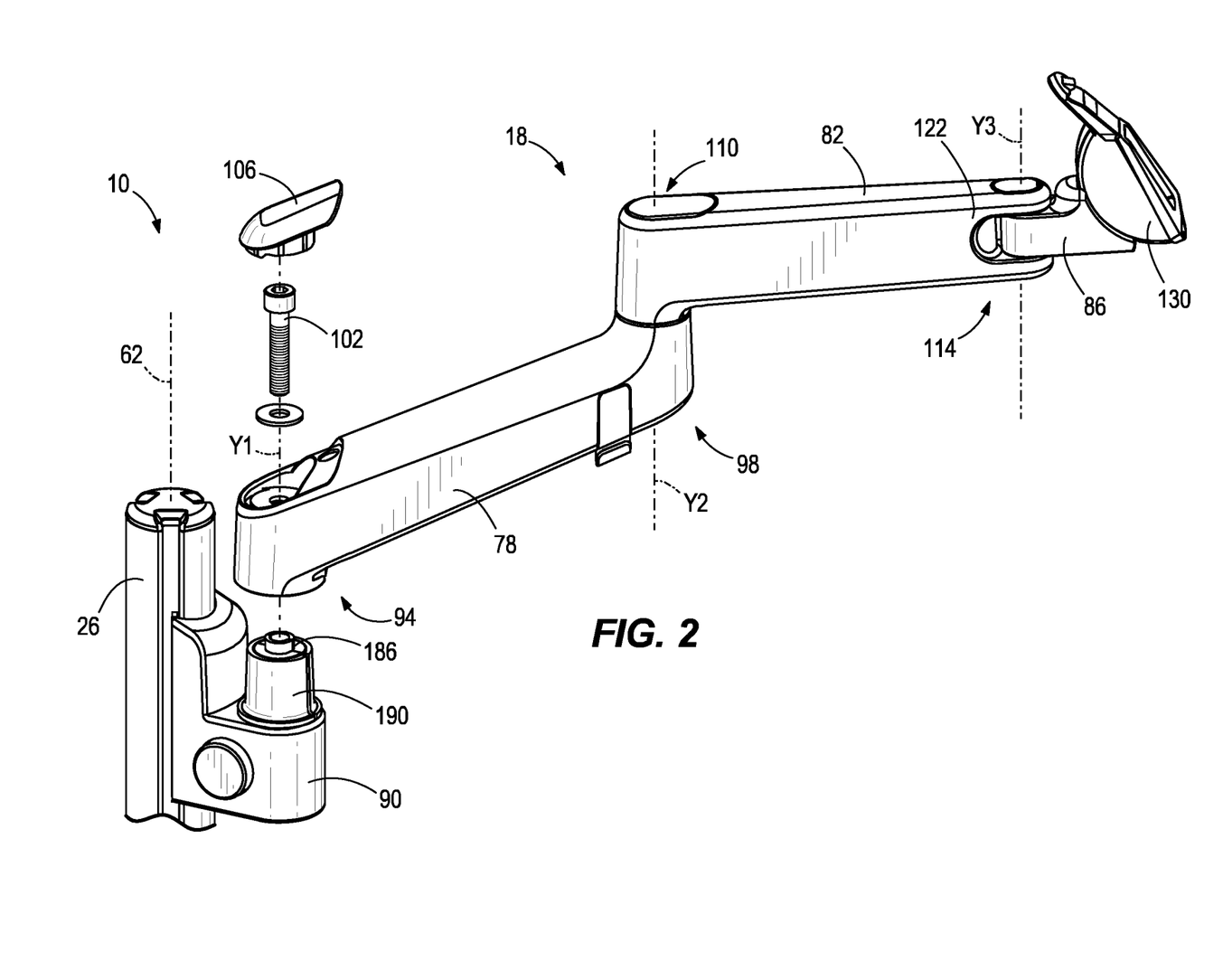
FIG. 2 is an exploded view of an arm assembly of the support structure of FIG. 1.

With reference to FIG. 2, the arm assembly 18 includes a first arm 78, a second arm 82, a mounting head 86, and a grip assembly 90. The first arm 78 includes a first end 94 and a second end 98 opposite the first end 94. The first end 94 of the first arm 78 is coupled to the grip assembly 90 and rotatable about an axis Y1. A fastener 102 is used to secure the first arm 78 to the grip assembly 90. A cap 106 on the first end 94 of the first arm 78 is placed over the fastener 102 to conceal it. The second arm 82 includes a first end 110 and a second end 114 opposite the first end 110. The first end 110 of the second arm 82 is rotatably coupled to the second end 98 of the first arm 78 about an axis Y2. The second end 114 of the second arm 82 includes a connecting portion 122 in which the mounting head 86 is positioned. The mounting head 86 is coupled to the connecting portion 122 and is rotatable about an axis Y3. The mounting head 86 includes a tilt head 130 configured to couple a display to the arm assembly 18, for example through a connection to a mounting plate. In other embodiments, a display may be coupled to the mounting head 86 with fasteners or other supports. The first, second, and third axes of rotation Y1, Y2, Y3 allow the first arm 78, second arm 82, and mounting head 86 to position a display or other screen into a number of positions. As such, the arm assembly 18 is articulated. In some embodiments, the first arm 78, the second arm 82, and the mounting head 86 may be made from injection molded plastics.

Figure 3:
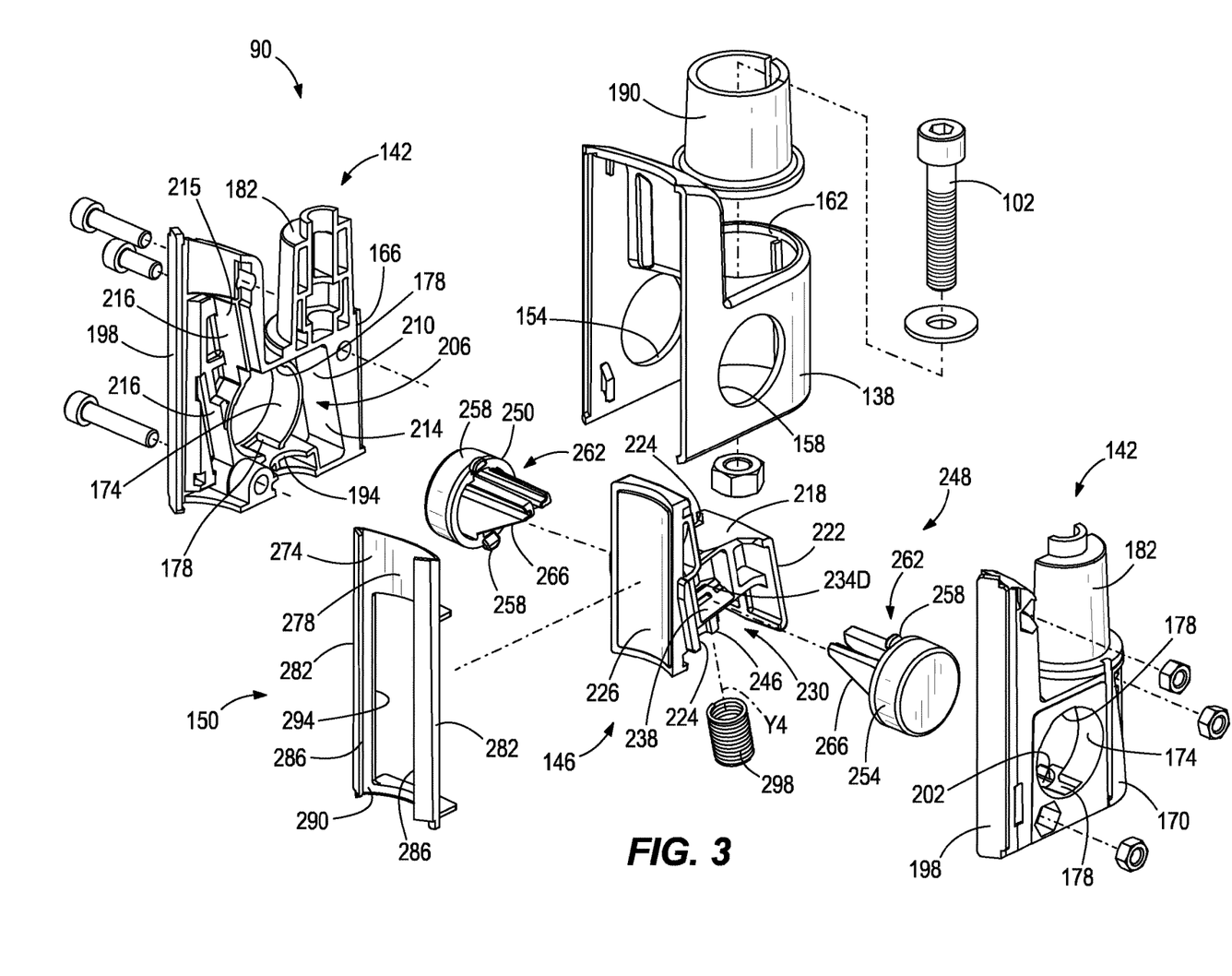
FIG. 3 is an exploded view of a grip assembly of the support structure of FIG. 1.

With reference to FIG. 3, the grip assembly 90 movably couples the arm assembly 18 to the post assembly 14. The grip assembly 90 includes a cover 138, an inner housing 142, a retention component, for example the holder 146, and a bearing 150. In the illustrated embodiment, the cover 138 conceals the inner housing 142. In other embodiments, the cover 138 may be removed without affecting the functionality of the grip assembly 90. The cover 138 includes a first side aperture 154, a second side aperture 158 opposite the first side aperture 154, and a top aperture 162. The inner housing 142 is positioned within the cover 138. The inner housing 142 includes a first housing portion 166 and a second housing portion 170. Both the first housing portion 166 and the second housing portion 170 include an aperture 174 that when positioned inside the cover 138 align with the first and second side apertures 154, 158 of the cover 138. The apertures 174 of the first and second housing portions 166, 170 both include an upper and lower tab slot 178. The first and second housing portions 166, 170 further include extensions 182 that when placed adjacent each other within the cover 138 extend from the top aperture 162 to define a bearing seat 186 (FIG. 2). A bearing 190 is positioned on the bearing seat 186 and allows the first arm 78 of the arm assembly 18 to rotate relative to the grip assembly 90. The first housing portion 166 further includes a spring seat slot 194 and a forward extending lip 198. The second housing portion 170 includes a spring seat 202 that corresponds to the spring seat slot 194 and a forward extending lip 198. When the inner housing 142 is positioned within the cover 138, the spring seat 202 is positioned in the spring seat slot 194. Additionally, when the inner housing 142 is positioned within the cover 138, the first and second housing portions 166, 170 define a cavity 206 therebetween. Although only shown for the first housing portion 166, the cavity 206 defines a back wall 210 that includes an inclined surface 214 and a front wall 215, with inclined surfaces 216.

Figure 4:
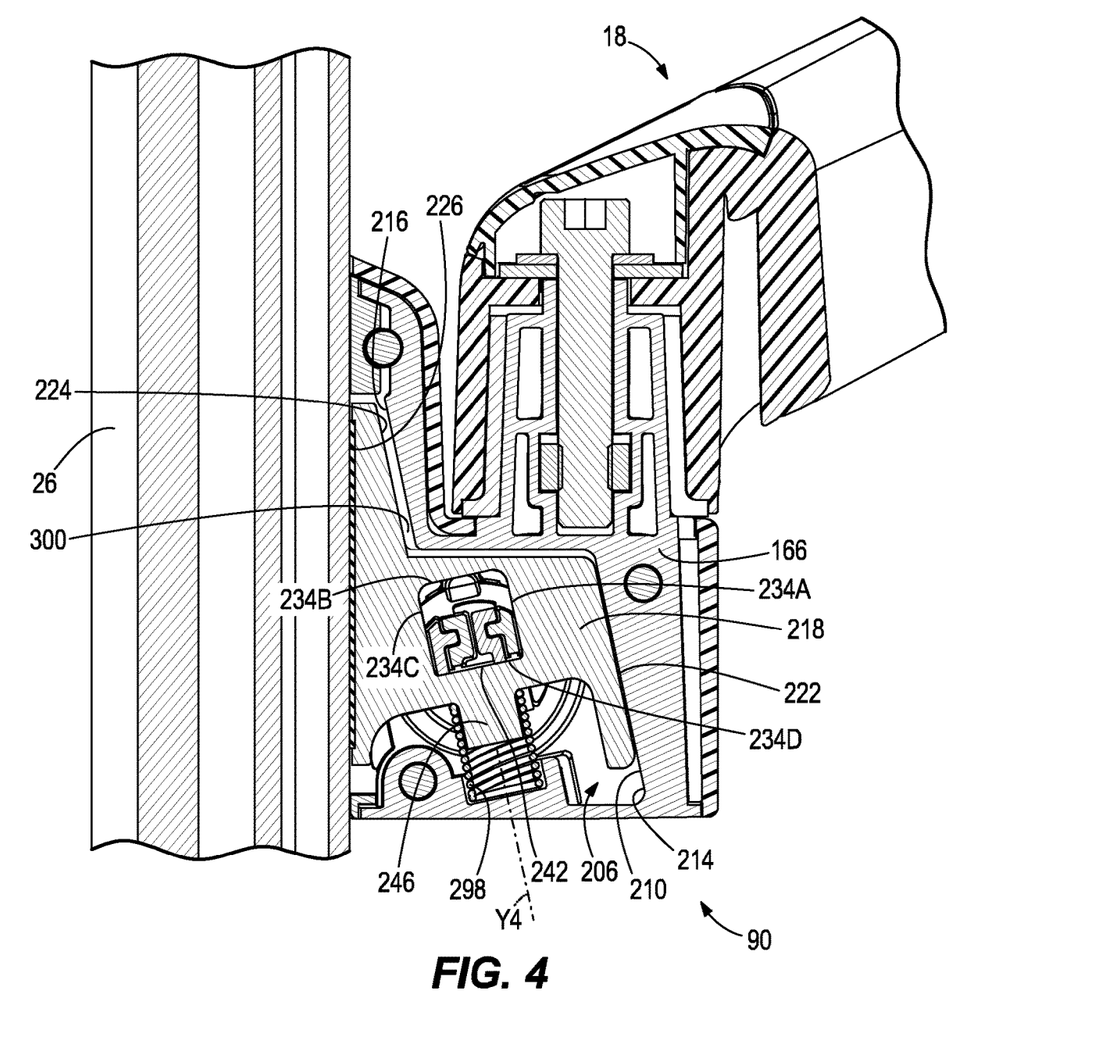
FIG. 4 is a cross-sectional view of the grip assembly engaged to a post taken along lines 4-4 of FIG. 1.

With continued reference to FIG. 3, the holder 146 is positioned within the cavity 206. The holder 146 includes a wedge component 218 with a rear inclined surface 222 that is engaged with the inclined surface 214 of the back wall 210. The wedge component further includes front inclined surfaces 224 that are engaged with the inclined surfaces 216 of the front wall 215. The holder 146 further includes a gripping pad 226 opposite the front inclined surfaces 224. The gripping pad 226 can include a sticky substance that provides a high coefficient of friction and thus a high friction force when in contact with another surface. In some embodiments, the sticky substance may be a thermoplastic elastomer or thermoplastic polyurethane. In further embodiments, the gripping pad 226 is over molded onto the holder 146. A channel 230 is positioned within the wedge component 218. The channel 230 is generally rectangular and defined by four sides 234A-D (FIG. 4). A bottom side 234D of the channel 230 is defined by two inclined surfaces 238 that come together at an apex 242 (FIG. 4). On the opposite side of the apex 242, a projection 246 extends away from the channel 230.

The grip assembly further includes an actuator assembly 248 with a first button 250 that is positioned in the aperture 174 of the first housing portion 166 of the inner housing 142 and a second button 254 that is positioned within the aperture 174 of the second housing portion 170 of the inner housing 142. In some embodiments, a single button or other actuator may be used. Both the first and second buttons 250, 254 include an upper and lower tab 258 that are positioned within the upper and lower tab slots 178, respectively, of the respective housing portions 166, 170 to secure the first and second buttons 250, 254 to the grip assembly 90. The first and second buttons 250, 254 also include a bifurcated projection 262 with an inclined surface 266. The inclined surface 266 of the bifurcated projections 262 are positioned on the inclined surfaces 238 within the channel 230. As such, the inclined surface 266 on the first button 250 is positioned on the inclined surface 238 of the channel 230 that is positioned nearer the first housing portion 166 and the inclined surface 266 on the second button 254 is positioned on the inclined surface 238 of the channel 230 that is positioned nearer the second housing portion 170. The bifurcated projection 262 of the first button 250 is interlocked with the bifurcated projection 262 of the second button 254 when positioned inside the channel 230.

The bearing 150 of the grip assembly 90 is positioned between the forward extending lips 198 of the first and second housing portions 166, 170 of the inner housing 142. The bearing 150 includes a top side 274 with a bearing surface 278, two lateral sides 282 that have forward extending edges 286 that correspond to the forward extending lips 198 of the first and second housing portions 166, 170, a bottom side 290, and an opening 294 defined between the sides 274, 282, 290. The gripping pad 226 of the holder 146 protrudes from the opening 294 towards the post 26. The grip assembly 90 also includes a resilient member 298 positioned on the spring seat 202 of the second housing portion 170 and on the projection 246 of the holder 146. The projection 246 defines an axis Y4 that the spring is positioned around. The axis Y4 is slightly angled relative to the axes Y1, Y2, Y3 and parallel to the back and front walls 210, 215. As such, the resilient member 298 biases the wedge component 218 of the holder 146 towards the post 26 in a direction along the axes Y4 so that the front and rear inclined surfaces 222, 224 of the holder 146 are pressed against the inclined surfaces 214, 216 of the inner housing 142. Additionally, fasteners may be used to secure and hold the grip assembly 90 together.

During installation, the forward extending lips 198 of the first and second housing portions 166, 170 are aligned with the edges 70 of the tracks 66. The arm assembly 18 can then be slid axially onto a track 66.

Figure 5:
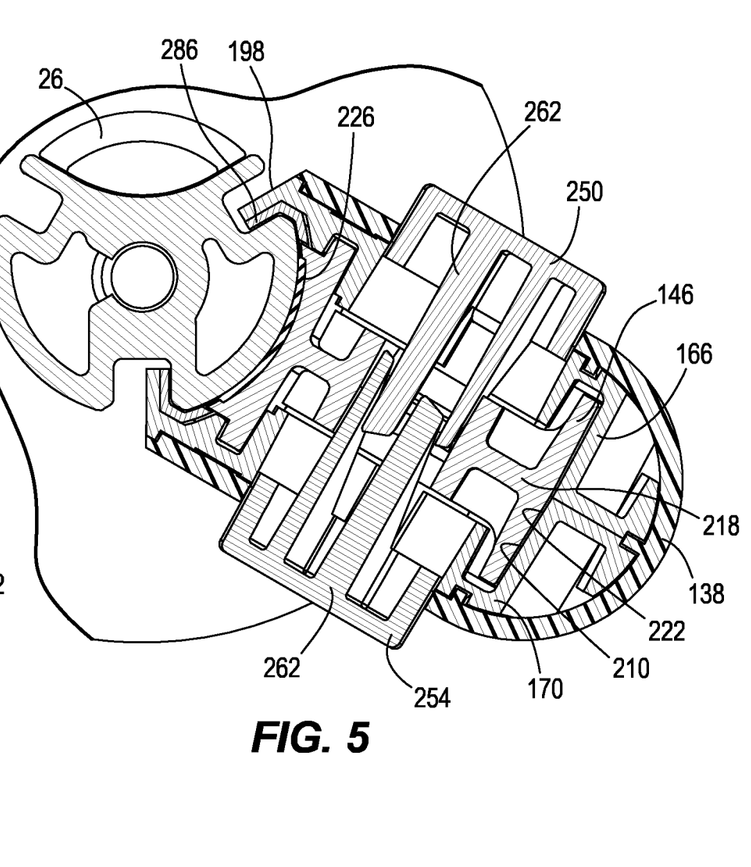
FIG. 5 is a cross-sectional view of the grip assembly engaged to a post taken along lines 5-5 of FIG. 1.
Figure 6:
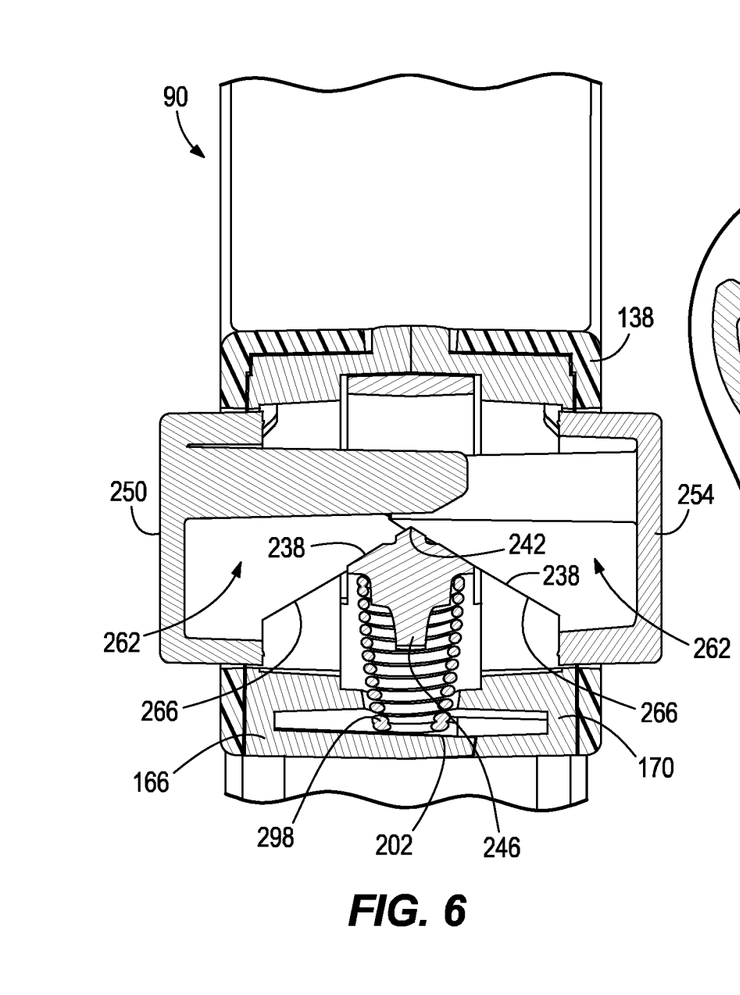
FIG. 6 is a cross-sectional view of the grip assembly engaged to a post taken along lines 6-6 of FIG. 1.

As shown in FIGS. 4-6, as the arm assembly 18 is positioned on the post assembly 14, the grip assembly 90 engages the post 26. When the grip assembly 90 is engaged with the post 26, the resilient member 298 pushes the holder 146 against the post 26 forcing the inclined surfaces 222, 224 against the inclined surfaces 214, 216. As a result, the inclined surfaces 214, 216 on the back and front walls 210, 215 of the cavity 206, push the holder 146 back towards the post 26, along the axis Y4, creating a clamping force. Due to the inclined surfaces, the clamping force creates a horizontal component that acts in a direction perpendicular to the axes Y1, Y2, Y3 and a vertical component that acts in a direction parallel to the axes Y1, Y2, Y3. The horizontal component of the clamping force causes the gripping pad 226 to engage the post 26 securing the arm assembly 18 in its position on the post 26. The bias of the holder 146 also forces the inclined surfaces 238 of the bottom side 234D of the channel 230 to bias the first and second buttons 250, 254 to extend out of the first and second side apertures 154, 158 of the cover 138.

With reference to FIG. 4, although the holder 146 is engaged with the post 26, there is a clearance 300 between the top of the wedge component 218 and the top of the cavity 206. As additional loads are added to the arm assembly 18 (e.g., a display), the clamping force increases. The increase to the vertical component of the clamping force moves the inclined surfaces 214, 216 of the front and back walls 210, 215 down the inclined surfaces 222, 224 of the wedge component 218, thus decreasing the clearance 300. Additionally, the increase to the horizontal component of the clamping force further presses the gripping pad 226 against the post 26. In other words, additional loads further support the arm assembly 18 on the post 26.

Figure 7:
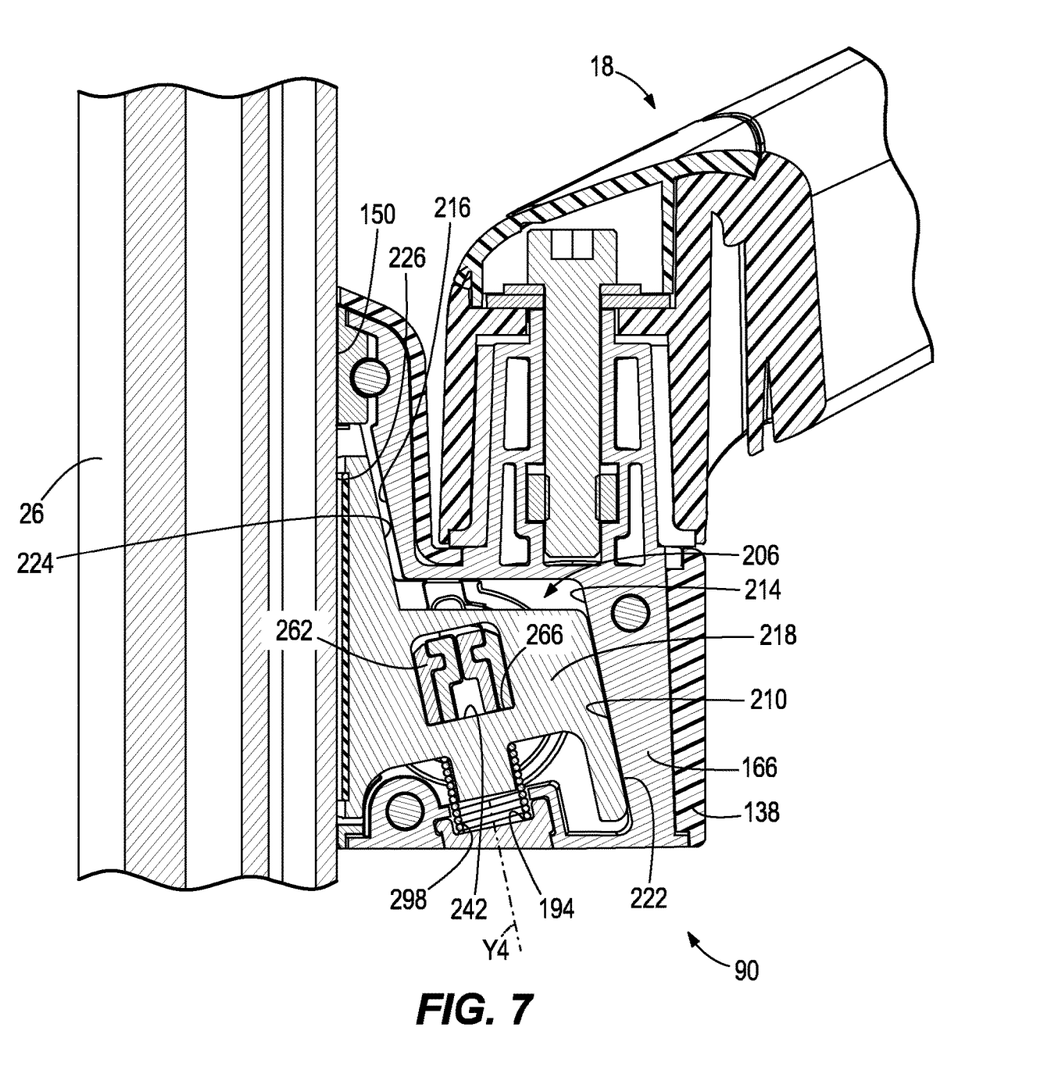
FIG. 7 is a cross-sectional view of the grip assembly disengaged from a post taken along lines 4-4 of FIG. 1.
Figure 8:
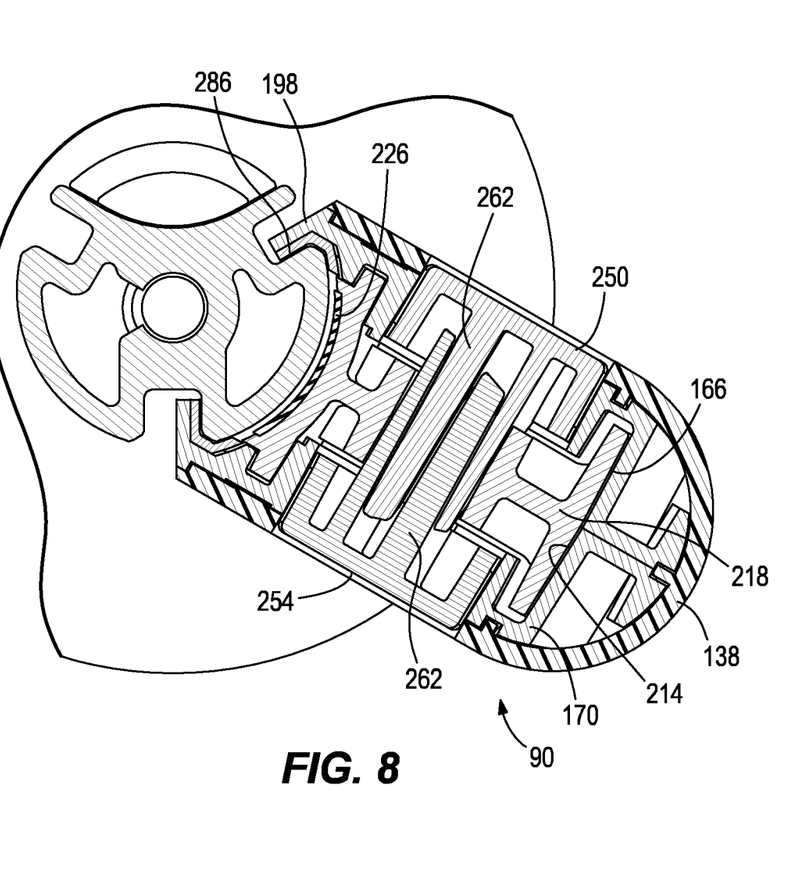
FIG. 8 is a cross-sectional view of the grip assembly disengaged from a post taken along lines 5-5 of FIG. 1.
Figure 9:
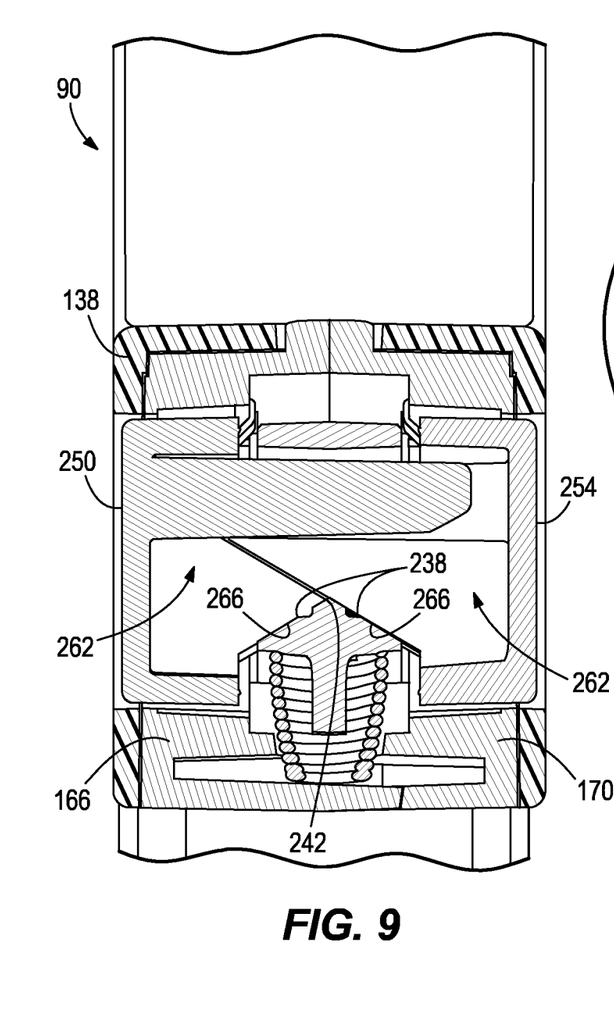
FIG. 9 is a cross-sectional view of the grip assembly disengaged from a post taken along lines 6-6 of FIG. 1.

As shown in FIGS. 7-9, in order to move the arm assembly 18, the gripping pad 226 must be disengaged from the post 26. To disengage the gripping pad 226 from the post 26, a user presses the actuator assembly 248 (i.e., the first and second buttons 250, 254 simultaneously) which causes the inclined surfaces 266 on the first and second buttons 250, 254 to slide along the inclined surfaces 238 of the bottom side 234D of the channel 230 forcing the holder 146 against the bias of the resilient member 298 and moving the holder 146 along the axis Y4 and away from the post 26. As the holder 146 slides, the inclined surfaces 222, 224 of the wedge component 218 slide along the inclined surfaces 214, 216 of the front and back walls 210, 215 of the cavity 206 drawing the holder 146 and the gripping pad 226 away from the post 26. Once the gripping pad 226 is disengaged from the post 26, a user may slide the arm assembly 18 axially along the post 26 to a desired height. The bearing surface 278 of the bearing 150 provides a smooth surface for the arm assembly 18 to slide along the post 26. Once at a desired height, a user can release the actuator assembly 248 (i.e., first and second buttons 250, 254), allowing the gripping pad 226 to reengage the post 26 to secure it in place.

Figure 10:
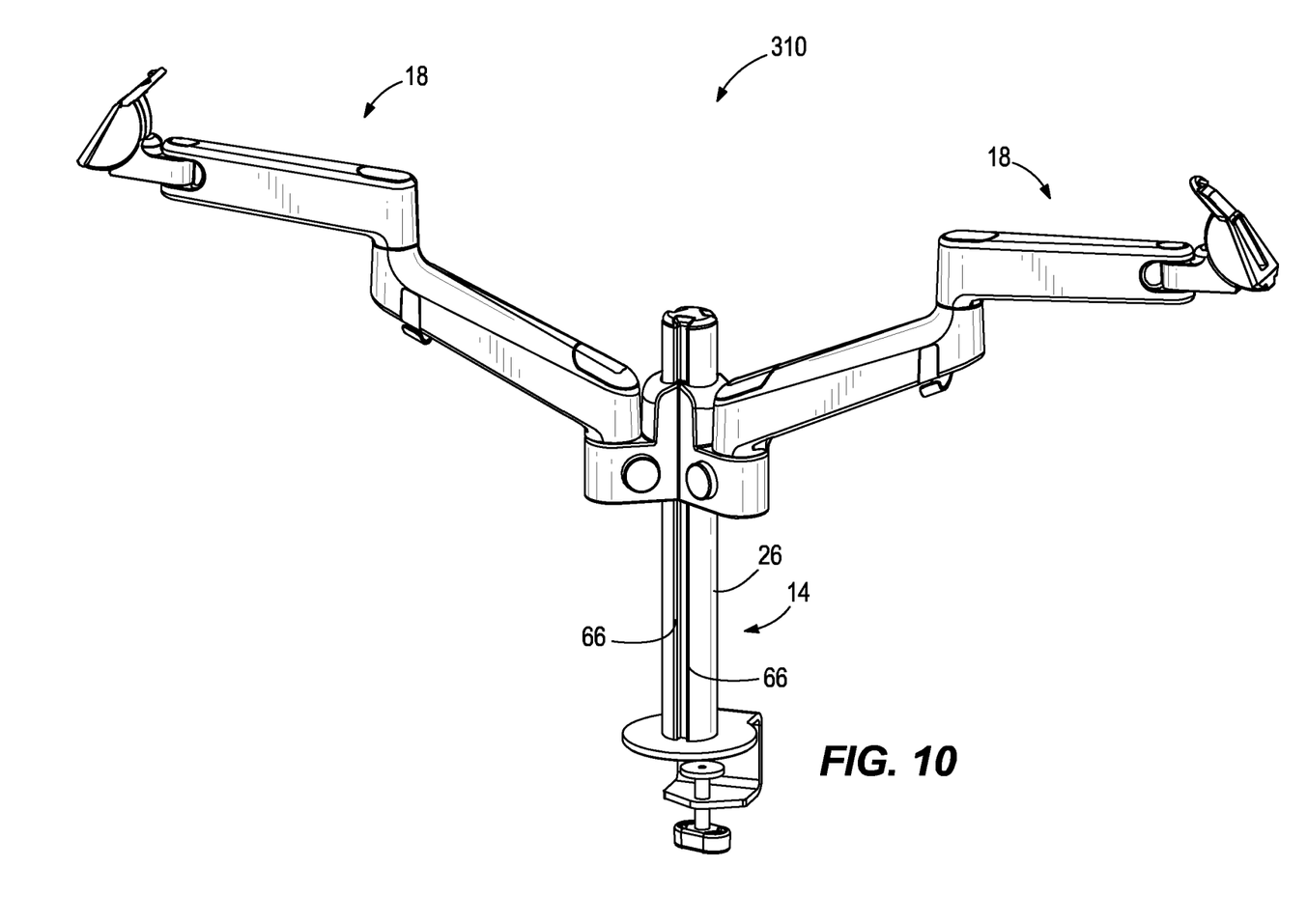
FIG. 10 is a perspective view of another embodiment according to the invention.

FIG. 10 illustrates a support structure 310 according to another embodiment of the invention. The support structure 310 is similar to the support structure 10 but includes two arm assemblies 18 to support two displays. The two arm assemblies 18 of the support structure operate the same way as the arm assembly 18 discussed above. The two arm assemblies 18 are coupled to the post assembly 14 in tracks 66 adjacent one another. Both the arm assemblies 18 can be operated without influencing the other. In other embodiments, the support structure may include three or more arm assemblies 18 to support a third display.

Providing a support structure with a post assembly and an arm assembly that articulates and includes a gripping assembly that allows for the articulation and versatility to position a display a number of ways. Additionally, providing an actuator assembly including first and second buttons allows for the easy height adjustment of an arm assembly to a position more desirable to a user to view a display.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed is:

1. A support structure for supporting a display comprising:
   a post extending along a longitudinal axis between a first end and a second end;
   an arm movably coupled to the post;
   a grip assembly for moveably coupling the arm to the post, the grip assembly including,
      a housing including a cavity having an opening facing the post and a back wall positioned opposite the opening,
      an actuator assembly,
      a retention component movably positioned in the housing, the retention component having a rear surface facing the back wall, and
      a resilient member that biases the retention component to a first position, in which, the grip assembly is engaged to the post to maintain the position of the arm to the post,
   wherein the retention component and resilient member are movable in the housing at an oblique angle to the longitudinal axis of the post and wherein the rear surface directly engages the back wall in the first position to bias the retention component toward the post.

2. The support structure of claim 1, wherein a clearance is formed between an upper surface of the retention component and an upper wall of the cavity in the first position.

3. The support structure of claim 1, wherein movement of the actuator assembly is configured to move the retention component to a second position, in which the grip assembly is disengaged from the post.

4. The support structure of claim 3, wherein the grip assembly is movable in an axial direction of the post.

5. The support structure of claim 4, wherein the grip assembly further includes a bearing surface that assists a user in moving the arm relative to the post.

6. The support structure of claim 1, wherein the post includes a set of tracks and the grip assembly is movable within the tracks.

7. The support structure of claim 6, wherein the grip assembly includes a forward extending lip that engages one of the tracks.

8. The support structure of claim 1, wherein the arm includes a first arm rotatably coupled to the grip assembly, a second arm rotatably coupled to the first arm, and a mounting head rotatably coupled to the second arm.

9. The support structure of claim 1, further comprising a second arm coupled to the post.

10. The support assembly of claim 1, wherein the gripper assembly includes a gripping pad having a higher coefficient of friction than the post.

11. The support structure of claim 1, wherein the post is configured to be coupled to a horizontal base.

12. A support structure comprising:
a post extending along a longitudinal axis between a first end and a second end, the post including a track;
an arm movably coupled to the post;
a grip assembly for moveably coupling the arm to the post, the grip assembly including,
a housing with a forward extending lip positioned on the track of the post;
an actuator assembly including a first actuator and a second actuator positioned opposite the first actuator,
a retention component movably positioned in the housing, and
a resilient member that biases the retention component to a first position, in which, the grip assembly is engaged to the post,
wherein the retention component and resilient member are movable in the housing at an oblique angle to the longitudinal axis of the post, and
wherein the first actuator and the second actuator translate relative to one another to depress the resilient member.

13. The support structure of claim 12, wherein the first and second actuators include interlocking bifurcated projections.

14. The support structure of claim 12, wherein movement of the actuator assembly is configured to move the retention component to a second position, in which the grip assembly is disengaged from the post.

15. The support structure of claim 12, wherein the forward extending lip is movable on the track when the retention component is in the second position.

16. The support structure of claim 12, wherein the arm includes a mounting head configured to mount a display to the arm.

17. The arm support structure of claim 12, wherein the arm includes a first arm rotatably coupled to the grip assembly, a second arm rotatably coupled to the first arm, and a mounting head rotatably coupled to the second arm.

18. A grip assembly for coupling a support structure to a post comprising:
an inner housing including a first portion and a second portion, the first and second portions defining a cavity therebetween;
a retention member movably positioned within the cavity of the inner housing, the retention member including a wedge component, a contact surface, and a channel defined between the wedge component and the contact surface;
a first button positioned in the channel of the retention member;
a second button positioned opposite the first button in the channel of the retention member; and
a resilient member that biases the retention member to a first position in which the contact surface engages a post,
wherein movement of the first and second buttons towards each other moves the retention member against the bias of the resilient member to a second position in which the contact surface is disengaged from the post, and
wherein movement of the retention member provides a clamping force in a first direction and a second direction different from the first direction.

19. The grip assembly of claim 18, wherein the wedge component of the retention member includes a first inclined surface that engages a second inclined surface of the inner housing.

20. The grip assembly of claim 19, wherein movement of the retention member from the first position to the second position is along the second inclined surface of the inner housing.

21. The grip assembly of claim 18, wherein the first and second buttons include bifurcated projections that are interlocked.

22. The grip assembly of claim 18, further comprising a cover that the inner housing is positioned within.

23. The grip assembly of claim 21, wherein the bifurcated projections of the first and second buttons include inclined surfaces that engage a bottom side of the channel.

* * * * *